Dec. 27, 1932.  R. A. HINKLEY  1,891,929
FLEXIBLE COUPLING
Filed March 26, 1930
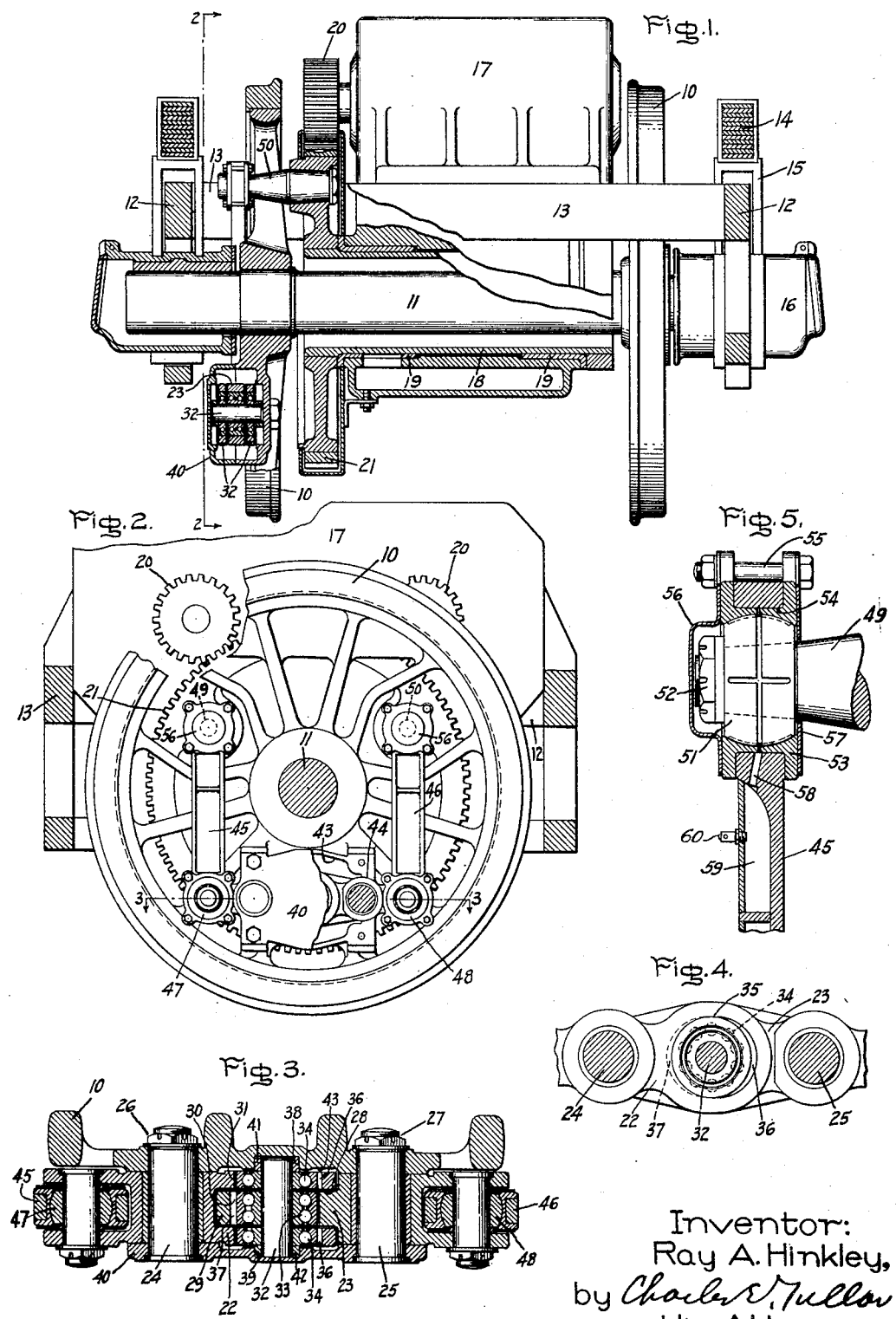
Inventor:
Ray A. Hinkley,
by Charles E. Tullar
His Attorney.

Patented Dec. 27, 1932

1,891,929

UNITED STATES PATENT OFFICE

RAY A. HINKLEY, OF ERIE, PENNSYLVANIA, ASSIGNOR TO GENERAL ELECTRIC COMPANY, A CORPORATION OF NEW YORK

FLEXIBLE COUPLING

Application filed March 26, 1930. Serial No. 439,207.

My invention relates to flexible couplings of the type employed for connecting together two rotatable parts in such manner as to permit their moving with respect to each other.

The object of my invention is the provision of a flexible coupling of this type which is of simple and rugged construction, and in which the bearings of the coupling can be readily enclosed. I accomplish this by providing a flexible coupling including two rotatable elements having arms pivotally connected intermediate the ends thereof to one of the rotatable elements and slidably and pivotally connected together at the adjacent ends thereof and having the other ends of the arms connected to the other rotatable element.

My invention will be more fully set forth in the following description referring to the accompanying drawing, and the features of novelty which characterize my invention will be pointed out with particularity in the claims annexed to and forming a part of this specification.

In the drawing Fig. 1 is a transverse section of an electric locomotive embodying my invention; Fig. 2 is a section, partly broken away approximately, on the line 2—2 of Fig. 1; Fig. 3 is a section on the line 3—3 of Fig. 2; Fig. 4 is a side elevation of the adjacent ends of the arms of the coupling, and Fig. 5 is a sectional view showing the universal conection between the links of the coupling and the driving gear pins of the locomotive.

Referring to the drawing, I have shown my improved flexible coupling in connection with a locomotive having driving wheels 10 which are rigidly mounted on an axle 11 in accordance with the usual practice. The locomotive includes side frames 12 arranged outside of the driving wheels and connected by cross-ties 13 which constitute the frame structure of the locomotive. This frame structure is supported on the axle 11 by a spring system which includes springs 14 resting intermediate the ends thereof on saddles 15 extending about the side frames 12 and resting on outside journal boxes 16 which are slidably fitted in pedestal jaws of the side frames. A quill shaft 18 is arranged about the axle 11 and supported in bearings 19 formed integral with the frame of a double motor 17 which drives the locomotive. The motor is provided with pinions 20 which mesh with a driving gear 21 mounted on the quill shaft 18. The motor, pinion, driving gear, and quill shaft constitute a unitary structure which is supported on the cross-ties 13 of the locomotive.

In a locomotive of this construction it is necessary to provide a flexible coupling between the driving gear and the driving wheels which will not restrict movement of the frame of the locomotive with respect to the axle 11, which occurs whenever the locomotive rounds a curve, or passes over irregularities in the track, because of the resiliency of the spring suspension system.

In accordance with my invention this flexible coupling is obtained by pivotally connecting two arms intermediate the ends thereof to the driving wheel, providing a slidable and pivotal connection between the adjacent ends of the arms, and connecting the other ends of the arms to the driving gear. It will be understood of course that the particular arrangement of the parts will be varied to make the coupling applicable to the locomotive construction, or to any other construction with which it is used. In the particular construction illustrated, I provide two arms 22 and 23 (Figs. 3 and 4) which are pivotally supported intermediate the ends thereof on pins 24 and 25 rigidly secured to the driving wheel as indicated at 26 and 27. The adjacent ends of the arms 22 and 23 are slidably and pivotally connected together in such manner as to provide a simple and compact construction which is adequate to transmit the forces to which the coupling is subjected, and which can be readily enclosed so as to exclude dust and dirt and provide a lubricating chamber. This slidable and pivotal connection is formed by slotting the end of the arm 22, as indicated at 28, to receive the end 29 of the arm 23, providing transversely aligned slots 30 and 31 in the adjacent ends of the arms, and providing a member 32 extending through the openings in the arms and having ball bearings 33 and 34 thereon which fit the sides of the openings 30 and 31 respectively. The openings 30 and 31 are somewhat elongated, as shown in Fig. 4, and are formed to closely fit the outer race of the ball bearings, as indicated at 35 in Fig. 4, and to provide a slight clearance at the sides thereof, as indicated at 36 and 37. In this way the member 32 and the ball bearings carried thereby form a mechanical connection between the adjacent ends of the arms which transmits the force supplied to the coupling from one arm to the other without restricting their flexibility.

In order to keep the ball bearings 33 and 34 in correct alignment and also retain them in the same relation with respect to each of the arms I provide parallel guides 38 and 39 in the wheel 10 and in the plate 40 respectively, bushings 41 and 42 being fitted on the ends of the member 32 and flattened to fit the guides.

In order to enclose the adjacent ends of the arms 22 and 23 so as to exclude dust and dirt and provide a lubricating chamber for the connection between them, I form a recess 43 in the wheel which extends about the adjacent ends of the coupling and is large enough to permit the movement of the arms required within the range of flexibility of the coupling. The recess 43 is formed with an arcuate bearing surface 44 which fits the arcuate surface of the arms about the pins on which they are pivotally mounted, and these joints may be packed, if desired, to prevent the leakage of oil from recess 43. The adjacent ends of the arms are enclosed in the recess 43 by the plate 40. Non-adjacent ends of the arms 22 and 23 of the coupling are connected to the driving gear 21 of the locomotive by links 45 and 46 having a universal connection with the ends of the arms as indicated at 47 and 48, and also with the driving gear pins 49 and 50, as shown in Fig. 5. The driving gear pins extend between the spokes of the driving wheel to the outside thereof so that the entire flexible coupling is arranged outside of the wheel making it readily accessible for inspection or repair.

As shown in Fig. 5 the universal connection between the link 45 and the driving gear pin 49 comprises a truncated sphere 51 which is rigidly secured to the pin 49 by a nut 52, on which are fitted bearings 53 secured in the opening 54 in the end of the link 45 by bolts 55. This universal connection is inclosed by a cap 56 and a plate 57 to retain oil, and oil is supplied thereto through passage 58 from the reservoir 59 which can be filled through the connection 60. The other universal connections between the ends of the links 45 and 46 and the arms and the driving gear pins may be lubricated in a similar manner.

The foregoing described construction provides a flexible coupling between the driving gear and the driving wheel of the locomotive which transmits torque from the driving gear to the driving wheel in all positions of the frame and the structure carried thereby with respect to the axle. Irregularities in the track may cause the axle 11 to be moved out of the center of the quill 18 due to vertical movement of the axle with respect to the frame. It will be apparent that this movement of the axle with respect to the quill requires that the coupling be radially flexible in all positions of the driving wheel with respect to the frame. The quill 18 may also be tilted out of alignment with axle 11 due to irregularities in the track, or a certain amount of axial movement of the quill with respect to the axle may take place due to swaying of the frame on the spring suspension system. The coupling which I have described freely permits of these relative movements between the driving gear and the wheel of the locomotive while transmitting the torque between the driving gear and the driving wheel at all times with only a slight variation in angular velocity ratio between the gear and the wheel.

In the position of the driving wheel shown in Figs. 1 and 2 vertical movement of the quill 18 and driving gear 21 with respect to the axle 11, to which relative movement they are restricted by the pedestal jaws engaging the journal boxes, causes vertical movement of the driving pins 49 and 50. This vertical movement causes the links 45 and 46 to swing the arms 22 and 23 about the pins 24 and 25, and the member 32 with the ball bearings 33 and 34 thereon is restrained to a vertical path by the parallel guideways 38 and 39. If the driving gear 21 is applying torque to the driving wheel to cause its rotation in a clockwise direction, as viewed in Fig. 2, the link 45 will be subjected to a tension stress and the link 46 will be subjected to a compression stress. The stresses to which these links are subjected are equal and opposite and act through the arms 22 and 23, which are pivotally connected intermediate the ends thereof to the driving wheel and to each other at the adjacent ends, to counterbalance each other in all positions of the driving gear with respect to the driving wheel so that the torque which the driving gear exerts is transmitted to the driving wheel in all positions of the driving gear with respect to the wheel. The forces are similarly balanced if torque is transmitted in the opposite direction. If there is any tilting or axial movement of the quill with respect to the axle the universal connection between the ends of the links 45 and 46 and the driving gear pins and the ends of the arms of the coupling permit this movement. When the driving gear is turned 90 degrees from the position shown in Figs. 1 and 2, then vertical movement of the quill 18 with respect to the axle 11 causes the links 45 and 46 to turn about their universal pivotal connections at the opposite ends thereof, there being a slight turning of the arms 22 and 23 about their pivotal supports to compensate for the angular movement of the links. It will thus be seen that the coupling provides free radial movement of the quill 18 and driving gear 21 with respect to the axle and the driving wheels in all positions of the wheel with respect to the frame of the locomotive. The angular velocity ratio between the driving gear and the driving wheel remains substantially constant in this construction because the links 45 and 46 are moved only very slightly out of parallel relation with each other within the limits of flexibility of the coupling.

Although I have described my improved coupling in connection with a particular locomotive construction, I do not desire my invention to be limited thereto, and I intend in the appended claims to cover all modifications which do not depart from the spirit and scope of my invention.

What I claim as new and desire to secure by Letters Patent of the United States, is:

1. A flexible coupling including two rotatable elements, two arms each pivotally connected intermediate the ends thereof to one of said rotatable elements, means for pivotally connecting the adjacent ends of said arms together on substantially the same axis, said ends being relatively slidable, and means for connecting the other ends of said arms to the other of said rotatable elements.

2. A flexible coupling including two rotatable elements, two arms each pivotally connected intermediate the ends thereof to one of said rotatable elements, a pivotal member, means for slidably and pivotally connecting the adjacent ends of said arms together about the axis of said pivotal member, and means for connecting the other ends of said arms to the other of said rotatable elements.

3. A flexible coupling including two rotatable elements, two arms each pivotally connected intermediate the ends thereof to one of said rotatable elements, means including a member extending substantially parallel to the axes of the pivots for said arms and pivotally connected to the adjacent ends of said arms on substantially the same axis for connecting them together, said ends being relatively slidable, and means for connecting the other ends of said arms to the other of said rotatable elements.

4. A flexible coupling including two rotatable elements, two arms each pivotally connected intermediate the ends thereof to one of said rotatable elements, means including a member slidably and pivotally connected to the adjacent ends of said arms for connecting them together, means carried by one of said rotatable elements for guiding said member, and means for connecting the other ends of said arms to the other of said rotatable elements.

5. A flexible coupling including two rotatable elements, two arms each pivotally connected intermediate the ends thereof to one of said rotatable elements, means for pivotally connecting the adjacent ends of said arms together on substantially the same axis, said ends being relatively slidable, said rotatable element to which said arms are pivotally connected having a recess extending about said arms and a cover cooperating with said recess to enclose said arms, and means for connecting the other ends of said arms to the other rotatable element.

6. A flexible coupling including two rotatable elements, two arms each pivoted intermediate the ends thereof to one of said rotatable elements, the adjacent ends of said arms having transversely aligned openings, means including a member extending through the openings in said arms for providing a sliding pivotal connection between them, and means for connecting the other ends of said arms to the other of said rotatable elements.

7. A flexible coupling including two rotatable elements, two arms each pivoted intermediate the ends thereof to one of said rotatable elements, the adjacent ends of said arms having transversely aligned openings, means including a member extending through the openings in said arms for providing a sliding pivotal connection between them, means carried by one of said rotatable elements for guiding said member, and means for connecting the other ends of said arms to the other of said rotatable elements.

8. A flexible coupling including two rotatable elements, two pins secured to one of said rotatable elements, two arms pivotally mounted intermediate the ends thereof on said pins and having transversely aligned openings in the adjacent ends thereof, means including a member extending through said aligned openings for connecting the adjacent ends of said arms, and means for connecting the other ends of said arms to the other of said rotatable elements.

9. A flexible coupling including two rotatable elements, two pins secured to one of said rotatable elements, two arms pivotally mounted intermediate the ends thereof on said pins and having transversely aligned openings in the adjacent ends thereof, means including a member extending through said aligned openings for connecting the adjacent ends of said arms, a guide for said member mounted on said pins, and means for connecting the other ends of said arms to the other rotatable element.

10. A flexible coupling including a rotatable element, arms pivotally connected intermediate the ends thereof to said rotatable element, means for pivotally connecting the adjacent ends of said arms on substantially the same axis, said ends being relatively slidable, and means for enclosing the adjacent ends of said arms between the pivotal connections with said rotatable element.

11. A flexible coupling including a rotatable element, arms pivotally connected intermediate the ends thereof to said rotatable element, means for pivotally connecting the adjacent ends of said arms on substantially the same axis, said ends being relatively slidable, and means including a portion fitting said arms about said pivotal connections for enclosing the adjacent ends of said arms.

12. A flexible coupling including a rotatable element, arms pivotally connected intermediate the ends thereof to said rotatable element, means for pivotally connecting the adjacent ends of said arms on substantially the same axis, said ends being relatively slidable, said rotatable element having a recess extending about said arms and said connecting means and arranged to form a joint with said arms about their pivotal connection with said rotatable element, and means cooperating with the recess in said rotatable element for enclosing the adjacent ends of said arms.

13. A flexible coupling including two rotatable elements, two arms each pivotally connected intermediate the ends thereof to one of said rotatable elements, means for pivotally connecting the adjacent ends of said arms together on substantially the same axis, said adjacent ends being relatively slidable, and links having a universal connection with the other ends of said arms and the other of said rotatable elements for connecting them together.

14. A flexible coupling including two rotatable elements, two arms each pivoted intermediate the ends thereof to one of said rotatable elements, the adjacent ends of said arms having transversely aligned openings, means including a member extending through the openings in said arms for providing a sliding pivotal connection between them, and links having a universal connection with the other ends of said arms and the other of said rotatable elements for connecting them together.

15. A flexible coupling including two rotatable elements, two pins secured to one of said rotatable elements, two arms pivotally mounted intermediate the ends thereof on said pins and having transversely aligned openings in the adjacent ends thereof, means including a member extending through said aligned openings for connecting the adjacent ends of said arms, and links having a universal connection with the other ends of said arms and the other of said rotatable elements for connecting them together.

16. A flexible coupling including two rotatable elements, two pins secured to one of said rotatable elements, two arms pivotally mounted intermediate the ends thereof on said pins and having transversely aligned openings in the adjacent ends thereof, means including a member extending through said aligned openings for connecting the adjacent ends of said arms, a guide for said member mounted on said pins, and links having a universal connection with the other ends of said arms and the other of said rotatable elements for connecting them together.

In witness whereof, I have hereunto set my hand this 22nd day of March, 1930.

RAY A. HINKLEY.